3,074,847
APPETITE CONTROL COMPOSITION
Frank L. Bigsby, 3030 Grant St., Evanston, Ill.
No Drawing. Filed Apr. 27, 1960, Ser. No. 24,902
9 Claims. (Cl. 167—55)

The present invention relates to improved pharmaceutical compositions for the treatment of obesity, and more specifically, to appetite control drugs.

It is known that certain sympathomimetic drugs (also called anorexics or adrenergic drugs) curb the appetite by stimulating certain centers in the sympathetic nervous system. Such drugs, of which the amphetamine drugs are the most common example, cannot be used alone because they frequently produce nervous stimulation severe to warrant their continued use. To combat this stimulation, it has previously been suggested that the amphetamine drugs be combined with various sedatives, such as barbiturates. In more recent times, such sympathomimetic drugs have been combined with the so-called tranquilizers in order to reduce this excessive nervous stimulation. However, I have found that both of the combinations mentioned above fall far short of the desired results in a large percentage of cases. My work has indicated that the simple combination of a sympathometic drug with a sedative or tranquilizer is inherently incapable of providing the proper response because this combination fails to take into account the concurrent effect upon the parasympathetic nervous system.

Accordingly, an object of the present invention is to provide an improved pharmaceutical composition for the treatment of obesity conditions.

A further object of the invention is to provide an improved composition for oral administration in appetite control.

A further object of the present invention is to provide an improved pharmaceutical composition which promotes the assimilation of sympathomimetic drugs without the side effects which occur when such drugs are used alone, or in combination with a sedative or tranquilizer.

I have now found that the appetite controlling effects of sympathomimetic drugs, such as amphetamine compounds can be used at maximum effectiveness, without significant side effects, by combining such drugs with a sympatholytic drug (sometimes called sympathetic blocking agents or adrenergic blocking agents), a parasympatholytic drug (also known as a parasympathetic blocking agent or an anti-cholinergic agent) and a central nervous system inhibitor.

The mechanism by which amphetamine type drugs cause weight loss has been explained as follows. The loss is caused almost entirely by a reduction in food intake and only in small measure by a variable increase in total energy metabolism. The voluntary reduction of food intake is due to a diminution in appetite or desire for food. This reduction is caused by the action of amphetamine on the brain, as evidenced by the fact that denervation of the alimentary tract in dogs does not alter the anorexia produced by the drug, and that the food intake of patients with bulimia occurring after frontal lobotomy is not decreased by the dose of amphetamine which causes anorexia in normal subjects. Experiments in man indicate that orally administered amphetamine sulfate decreases olfactory acuity and the acuity of sense of taste for sucrose. It is possible that the effectiveness of the drug in producing anorexia may be related, in part, to its ability to depress the acuity of these special senses.

The sympatholytic or adrenergic blocking agents are those which selectively inhibit the responses of effector cells to adrenergic sympathetic nerve impulses, and to sympathomimetic amine compounds.

The parasympatholytic drugs (as exemplified by the belladonna alkaloids) exhibit a highly selective blocking action on effector organs innervated by postganglionic cholinergic nerves. The site of this blocking action is directly on the effector cells concerned (smooth and cardiac muscle, exocrine glands) and is unrelated to the integrity of the innervation. The mechanism involved appears to be an increase in threshold of the effector cell to acetylcholine. Such alkaloids, at relatively high dosage levels, have sedative properties. However, in the compositions of this invention, they are used in relatively small amounts at which their activity is not sedation, but rather to facilitate absorption of the other components into the system. In fact, these material are more likely to be stimulants than sedatives in the new compositions.

The barbiturates uniformly tend to decrease the tonus of the gastrointestinal musculature and the amplitude of rhythmic contractions as measured in vitro, in experimental animals and in man. The locus of action is probably peripheral, either on the smooth muscle or on the intrinsic innervation. The barbiturates also relieve various gastrointestinal symptoms by their action on the central nervous system.

The following list of drugs is representative of sympathomimetic drugs which can be employed in the practice of the present invention:

*Sympathomimetic Drugs*

(1) Epinepherine (adrenaline; 3,4-dihydroxy-α(methylaminomethyl) benzyl alcohol).
(2) Levarterenol (α-(aminomethyl)-3,4-dihydroxybenzyl alcohol).
(3) Ephedrine (α-(1-methylaminoethyl) benzyl alcohol).
(4) Amphetamine (dl-α-methylphenethylamine).
(5) Phenylephrine (1-m-hydroxy-α-(methylaminomethyl) benzyl alcohol).
(6) Methoxamine (α-(α-aminoethyl)-2,5-dimethoxybenzyl alcohol).
(7) Mephentermine (N,α,α-trimethyl-phenethylamine).
(8) Phenylpropanolamine (α-(1-aminoethyl) benzyl alcohol).
(9) Isoproterenol (α-(isopropylaminomethyl) protocatechuyl alcohol).
(10) Methoxypenamine (B-(o-methoxypenyl) isopropylmethylamine).
(11) d-Amphetamine sulfate.
(12) Amphetamine hydrochloride.
(13) l-amphetamine.
(14) Methamphetamine.
(15) Amphetamine phosphate.
(16) Desoxyamphetamine.
(17) Hydroxyamphetamine.

Typical sympatholytic drugs are listed in the following table:

*Sympatholytic Drugs*

(1) Dibenamine (N-(2-chloroethyl)-dibenzylamine).
(2) Dibenzyline (N-(2-chlorethyl)-N-(1-methyl-2-phenoxyethyl)-benzylamine).
(3) Ergotamine tartrate.
(4) Priscoline (2-benzyl-2-imidazoline).
(5) Regitine (2-[N-(m-hydroxyphenyl)-p-toluidinomethyl] imidazoline).
(6) Benzodioxane (2-(1-piperidylmethyl) 1,4-benzodioxan).
(7) Yohimbine.
(8) Azopeptine.

Suitable parasympatholytic drugs are given in the following table:

*Parasympatholytic Drugs*

(1) Atropine.
(2) Atropine methylnitrate.

(3) Scopolamine.
(4) Scopolamine methylbromide.
(5) Scopolamine butylbromide.
(6) Homatropine.
(7) Homatropine methylbromide.
(8) Syntropan (3-diethylamino-2,2-dimethylpropyl tropate phosphate).
(9) Trasentine (2-diethylaminoethyl diphenylacetate).
(10) Pavatrine (2-diethylaminoethyl 9-fluorenecarboxylate).
(11) Banthine (B-diethylaminoethyl 9-xanthenecarboxylate).
(12) Pro-banthine (B-diisopropylaminoethyl 9-xanthenecarboxylate).
(13) Antrenyl (diethyl (2-hydroxyethyl) methylammonium-α-phenylcyclohexaneglycolate bromide).
(14) Monodral bromide (diethyl (2-hydroxyethyl) methylammonium bromide).

Suitable central nervous system inhibitors are listed in the following table:

*Central Nervous System Inhibitors*

(1) Barbital (5,5-diethylbarbituric acid).
(2) Aprobarbital (5-allyl-5-isoprophyl barbituric acid).
(3) Amobarbital (5-ethyl-5-isoamyl barbituric acid).
(4) Phenobarbital (5-ethyl-5-phenylbarbituric acid).
(5) Secobarbital (5-allyl-5-(1-methylbutyl)-barbituric acid).
(6) Pentobarbital (5-ethyl-5-(1-methylbutyl)-barbituric acid).
(7) Mephobarbital (5-ethyl-1-methyl-5-phenylbarbituric acid).
(8) Butabarbital (5-sec. butyl-5-ethyl barbituric acid).

The individual entries in the foregoing tables represent typical examples of drugs within the various classifications given. It should be appreciated, however, that various derivatives of the particular compounds listed may be employed, such as optical isomers, structural isomers, homologues, alkali metal salts, halides, hydrohalides, and similar derivatives, provided that the derivative possesses the same pharmalogical characteristics, and is non-toxic in the dosages employed.

It should also be recognized that the activity of the various compounds mentioned above vary with regard to the property for which they are employed. As a result of tests, I believe that the most useful compounds from each class are the following:

Sympathomimetic—Amphetamine compounds
Sympatholytic—Ergot compounds
Parasympatholytic—Scopolamine compounds
Central nervous system—Barbiturates As a result of this difference in activity level, the relative amounts and proportions of the ingredients in the composition may vary. Accordingly, the following table lists the preferred ranges of the ingredients in a tablet for unit dosage treatment:

| | Mg. |
|---|---|
| Amphetamine compound | 2–15 |
| Ergot compound | 0.1–0.3 |
| Scopolamine compound | 0.01–0.10 |
| Barbiturate | 5–15 |

The best composition which I have found consists of the following ingredients in the proportions indicated:

| | Mg. |
|---|---|
| d-Amphetamine sulfate | 5 |
| Ergotamine tartrate | 0.15 |
| Scopolamine | 0.05 |
| Phenobarbital | 9 |

On the basis of the foregoing tables, the proportions employed when using drugs other than those listed should be readily determinable. For example, racemic amphetamine is only about one-third as active as the d-amphetamine sulfate, and so about three times as much of the racemic compound would be employed as the dextrorotary isomer. Similarly, various ergot derivatives such as ergocornine and ergocristine are more active than the ergotamine, and so would be present in somewhat lower dosages.

Tests made with the compositions of the present invention have evidenced no undue side effects, and patients taking the compositions have experienced no significant insomnia.

It will be evident that various modifications can be made to the described embodiments without departing from the scope of the present invention.

I claim as my invention:

1. A pharmaceutical composition comprising the combination of a sympathomimetic drug having appetite control properties, a parasympatholytic drug, a sympatholytic drug, and a central nervous system inhibitor.

2. An appetite control composition comprising, in unit dosage form, the combination of a sympathomimetic drug having appetite control properties, a parasympatholytic drug, a sympatholytic drug, and a central nervous system inhibitor.

3. An appetite control composition, comprising the combination of a sympathomimetic drug having appetite control properties, a parasympatholytic drug, a sympatholytic drug, and a barbiturate.

4. An appetite control composition, comprising the combination of an amphetamine compound, a parasympatholytic drug, a sympatholytic drug, and a barbiturate.

5. An appetite control composition comprising the combination of an amphetamine compound, a parasympatholytic drug, a sympatholytic ergot derivative, and a barbiturate.

6. An appetite control composition, comprising the combination of an amphetamine compound, a belladonna alkaloid having parasympatholytic properties, a sympatholytic ergot derivative, and a barbiturate.

7. An appetite control composition comprising the following combination:

| | Mg. |
|---|---|
| Amphetamine compound | 2–15 |
| Sympatholytic ergot compound | 0.1–0.3 |
| Scopolamine compound | 0.01–0.10 |
| Barbiturate | 5–15 |

8. An appetite control composition, comprising the following combination in unit dosage form:

| | Mg. |
|---|---|
| d-Amphetamine sulfate | 2–15 |
| Ergotamine tartrate | 0.1–0.3 |
| Scopolamine | 0.01–0.10 |
| Phenobarbital | 5–15 |

9. An appetite control composition, comprising the following combination in unit dosage form:

| | Mg. |
|---|---|
| d-Amphetamine sulfate | 5 |
| Ergotamine tartrate | 0.15 |
| Scopolamine | 0.05 |
| Phenobarbital | 9 |

References Cited in the file of this patent

Journal of the American Pharmaceutical Assn. (JAPA), Practical Pharmacy Ed., February 1953, page 66.

American J. of Pharmacy (AJP), vol. 126, No. 1, January 1954, pp. 10 and 16.

Wilson, The American Drug Index, 1956, Lippincott Co., Philadelphia, Pa., pages 36 and 335.

U.S. Dispensatory, 25th ed., Lippincott Co., Philadelphia, Pa., pages 521 to 523.